(12) United States Patent
Lu et al.

(10) Patent No.: US 9,497,241 B2
(45) Date of Patent: Nov. 15, 2016

(54) CONTENT ADAPTIVE HIGH PRECISION MACROBLOCK RATE CONTROL

(75) Inventors: Ning Lu, Saratoga, CA (US); Hong Jiang, El Dorado Hills, CA (US); James M. Holland, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 305 days.

(21) Appl. No.: 13/995,587

(22) PCT Filed: Dec. 23, 2011

(86) PCT No.: PCT/US2011/067161
§ 371 (c)(1),
(2), (4) Date: Sep. 23, 2014

(87) PCT Pub. No.: WO2013/095627
PCT Pub. Date: Jun. 27, 2013

(65) Prior Publication Data
US 2015/0039779 A1    Feb. 5, 2015

(51) Int. Cl.
*G06F 15/16* (2006.01)
*G06F 15/173* (2006.01)
*H04L 29/06* (2006.01)
*H04N 19/176* (2014.01)
(Continued)

(52) U.S. Cl.
CPC ........... *H04L 65/601* (2013.01); *H04L 65/607* (2013.01); *H04N 19/115* (2014.11); *H04N 19/124* (2014.11); *H04N 19/132* (2014.11); *H04N 19/149* (2014.11); *H04N 19/167* (2014.11); *H04N 19/176* (2014.11); *H04N 19/18* (2014.11); *H04N 19/192* (2014.11); *H04N 19/60* (2014.11)

(58) Field of Classification Search
USPC ....... 709/203, 217, 219, 223, 224, 226, 228, 709/231, 232; 375/240.02, 240.036, 375/240.16, 240.26; 348/419.1; 341/107; 340/870.13
See application file for complete search history.

(56) References Cited

U.S. PATENT DOCUMENTS 6,298,090 B1 * 10/2001 Challapali ............ H04N 19/132
375/240.26
6,542,549 B1 * 4/2003 Tan ........................ H04N 19/20
348/419.1
(Continued)

FOREIGN PATENT DOCUMENTS

CN     1568007 A    1/2005
EP     1217842 A2   6/2002
(Continued)

OTHER PUBLICATIONS

International Search Report and Written Opinion received for PCT application No. PCT/US2011/067161, mailed on Sep. 14, 2012, 11 pages.
(Continued)

*Primary Examiner* — Quang N Nguyen
(74) *Attorney, Agent, or Firm* — Jordan IP Law, LLC (57) ABSTRACT

Methods and systems may include an apparatus having hardware logic to allocate a set of macroblock bit budgets for a bitstream associated with a video signal. The hardware logic can also control a frame size of the bitstream based on the set of macroblock bit budgets in a single pass encode configuration. In one example, the hardware logic adjusts one or more quantization parameters of the bitstream according to the set of macroblock bit budgets.

12 Claims, 4 Drawing Sheets

(51) Int. Cl.
*H04N 19/149* (2014.01)
*H04N 19/115* (2014.01)
*H04N 19/124* (2014.01)
*H04N 19/132* (2014.01)
*H04N 19/18* (2014.01)
*H04N 19/192* (2014.01)
*H04N 19/167* (2014.01)
*H04N 19/60* (2014.01)

(56) References Cited

U.S. PATENT DOCUMENTS

| | | | |
|---|---|---|---|
| 6,570,922 B1 | 5/2003 | Wang et al. | |
| 6,654,417 B1 | 11/2003 | Hui | |
| 7,366,240 B2* | 4/2008 | Chiang Wei Yin | H04N 19/176 375/240.02 |
| 7,595,743 B1* | 9/2009 | Winger | H04N 19/13 341/107 |
| 8,594,177 B2* | 11/2013 | Bjorklund | H04N 19/44 375/240 |
| 8,879,635 B2* | 11/2014 | Raveendran | H04N 5/144 340/870.13 |
| 2002/0122482 A1 | 9/2002 | Kim et al. | |
| 2005/0169370 A1 | 8/2005 | Lee | |
| 2008/0152010 A1* | 6/2008 | Youn | H04N 19/139 375/240.16 |
| 2009/0086816 A1 | 4/2009 | Leontaris et al. | |
| 2010/0166060 A1* | 7/2010 | Ezure | H04N 19/176 375/240.03 |

FOREIGN PATENT DOCUMENTS

| | | |
|---|---|---|
| JP | 2010541386 A | 12/2010 |
| KR | 10-2009-0074173 A | 7/2009 |
| TW | 571589 B | 1/2004 |
| TW | 200704190 A | 1/2007 |
| WO | 2006/004605 A2 | 1/2006 |
| WO | 2006/119410 A1 | 11/2006 |
| WO | 2008/039770 A2 | 4/2008 |
| WO | 2010/057170 A1 | 5/2010 |
| WO | 2013/095627 A1 | 6/2013 |

OTHER PUBLICATIONS

Office Action for Taiwanese Patent Application No. 101149004, dated Aug. 28, 2015, 16 pages, includes 8 pages of English translation.
European Search Report for EP Application No. 11878119.4, mailed Jan. 7, 2016, 11 pages.
Yutaka Yokoyama et al., "A Scene-Adaptive One-Pass Variable Bit Rate Video Coding Method for Storage Media", 1999 IEEE, 5 pages.
Office Action and Search Report for Taiwanese Patent Application No. 101149004, mailed Mar. 25, 2015, 20 pages including 10 pages of English translation.
International Preliminary Report on Patentability and Written Opinion received for PCT Patent Application No. PCT/US2011/067161, mailed on Jul. 3, 2014, 7 pages.

* cited by examiner

CONTENT ADAPTIVE HIGH PRECISION MACROBLOCK RATE CONTROL

BACKGROUND

Traditional rate control algorithms may be designed to achieve targeted video bit rates by using hardware logic to conduct quantization parameter (QP) adjustments at the frame and/or picture level of the video bitstream. When there is a scene change or content switch, a surge or drop in the compressed video bit rate can be encountered due to content complexity shifts associated with scene change. While one approach may be to use a new QP to re-encode the video frame in a second encoding pass, such a solution can create a delay that may be unacceptable for real-time applications such as video conferencing.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may involve a computer implemented method in which a set of macroblock bit budgets is allocated for a bitstream associated with a video signal. The method can also provide for controlling a frame size of the bitstream based on the set of macroblock bit budgets in a single pass encode configuration.

Embodiments may also include an apparatus having hardware logic to allocate a set of macroblock bit budgets for a bitstream associated with a video signal. The hardware logic can also control a frame size of the bitstream based on the set of macroblock bit budgets in a single pass encode configuration.

In addition, embodiments can include a system having a graphics processor with hardware logic to allocate a set of macroblock bit budgets for a bitstream associated with a video signal. The hardware logic may also control a frame size of the bitstream based on the set of macroblock bit budgets in a single pass encode configuration. In one example, the system also includes a hard drive coupled to the graphics processor.

Other embodiments may include a computer implemented method in which a macroblock complexity is determined for a bitstream associated with a video signal based on at least one of a macroblock pixel variance, a total high frequency magnitude, a residual error, and a previously coded number of bits. The method can also provide for determining a region of importance for the bitstream based on at least one of a static location, a content of the bitstream, and an external dynamic input. A set of macroblock bit budgets may be allocated for the bitstream based on the macroblock complexity and the region of importance. The method may include generating a macroblock size estimate to determine a running bit sum for the bitstream, wherein a comparison can be conducted between the running bit sum and the set of macroblock bit budgets. Additionally, the method may provide for selecting an update policy based on the comparison, and controlling a frame size of the bitstream based on the selected update policy in a single pass encode configuration.

Figure 1:
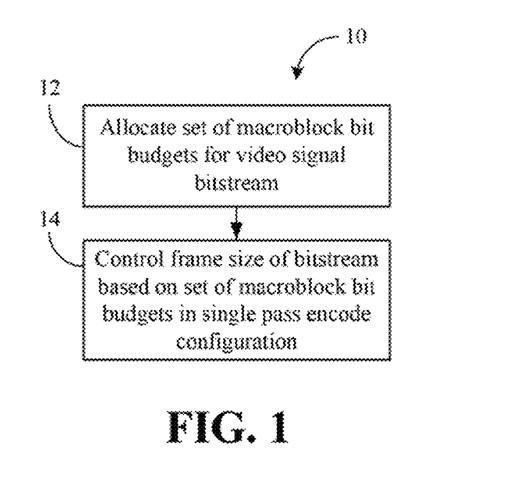
FIG. 1 is a flowchart of an example of a method of encoding video signals according to an embodiment.

Turning now to FIG. 1, a method 10 of encoding (e.g., compressing) video signals is shown. The method 10 may be implemented in fixed-functionality hardware of a wide variety of computing systems using circuit technology such as, for example, application specific integrated circuit (ASIC), complementary metal oxide semiconductor (CMOS) or transistor-transistor logic (TTL) technology, or any combination thereof. Illustrated processing block 12 provides for allocating a set of macroblock bit budgets for a bitstream associated with a video signal. As will be discussed in greater detail, the set of macroblock bit budgets can be allocated based on macroblock complexity information, region of importance information, and so forth, in a single pass encode configuration. Moreover, the set of macroblock bit budgets may include one or more budgets that can be used to track and control the frame size of the encoded bitstream at the macroblock level. In particular, the frame size of the bitstream may be controlled at block 14 based on the set of macroblock bit budgets in the single pass encode configuration.

Figure 2:
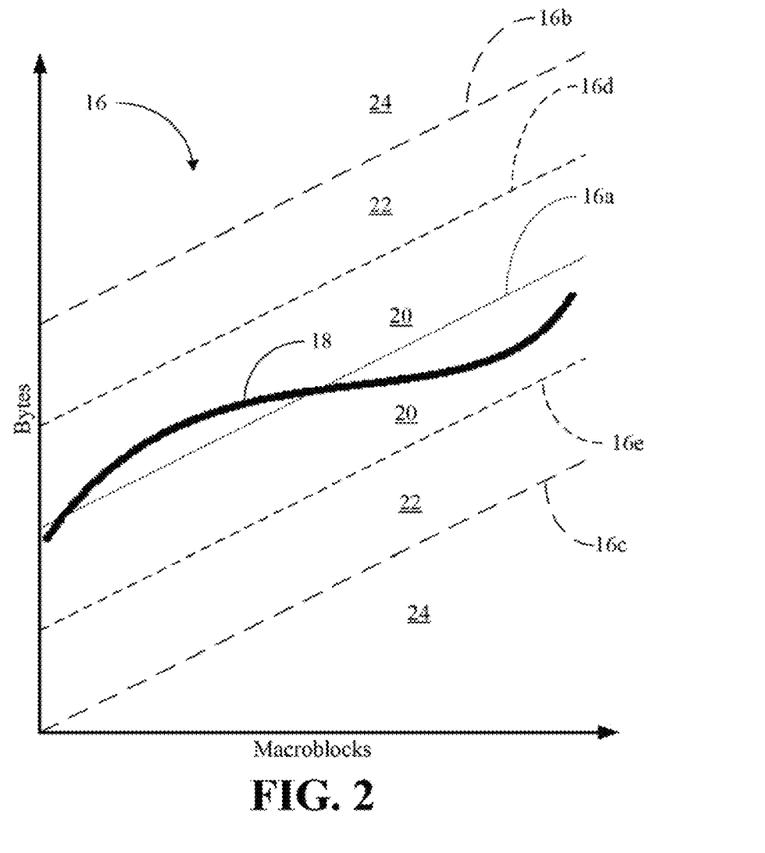
FIG. 2 is a plot of an example of a set of macroblock bit budgets according to an embodiment.

FIG. 2 shows one approach to implementing a set of macroblock bit budgets 16 (16a-16e) for a running bit sum 18 that corresponds to a video bit stream. The running bit sum 18 may represent the cumulative number of encoded/compressed bits for a video signal containing real-time content such as video conferencing content. In the illustrated example, the bit budgets 16 increase as the processed number of macroblocks increases, wherein a target macroblock bit budget 16a represents the target number of encoded bits budgeted over time. In addition, a maximum macroblock bit budget 16b may represent the maximum number of encoded bits budgeted over time, and a minimum macroblock bit budget 16c may represent the minimum number of encoded bits budgeted over time. In the illustrated example, the set of macroblock bit budgets 16 also includes an upper average 16d between the target macroblock bit budget 16a and the maximum macroblock bit budget 16b, as well as a lower average 16e between the target macroblock bit budget 16a and the minimum macroblock bit budget 16c. Other macroblock bit budgets may be used depending upon the circumstances.

As will be discussed in greater detail, the set of macroblock bit budgets 16 may define one or more regions 20, 22, 24, that can be used to select an update policy for the bitstream. The selected update policy may include, for example, one or more quantization parameter (QP) adjustments, discrete cosine transform (DCT) coefficient adjustments, and so forth. In general, DCT coefficients may enable the video signal to be monitored, analyzed and controlled in the frequency domain, wherein the QP of a video encoding system can establish the step size for associating the DCT coefficients with a finite set of steps. Thus, large values of QP may represent relatively large steps that roughly approximate the spatial transform, so that most of the signal can be captured by only a few coefficients. Small values of QP, on the other hand, can more accurately approximate the spatial frequency spectrum, but at the cost of more bits.

In the illustrated example, the regions 20 are located nearest the target macroblock bit budget 16*a*, the regions 24 are located the farthest away from the target macroblock bit budget 16*a*, and the regions 22 are disposed between the respective regions 20 and 24. Thus, if the running bit sum 18 transitions from regions 20 into regions 22, an update policy could be selected in order to curb the growth of the frame size on a macroblock-by-macroblock basis. For example, the response to such a transition may be to simply increase the QP by some small amount.

Similarly, if the running bit sum 18 transitions from regions 22 into regions 24, an even more aggressive update policy could be selected (e.g., "panic" mode). For example, the response to such a transition might be to set the QP to a maximal value or to zero out all transform coefficients except the zero frequency (e.g., DC) terms. Other data reduction techniques such as clamping frequency coefficients (e.g., limiting high frequency coefficients within a certain range to avoid long codes), and zeroing out high frequency coefficients (e.g., after a fixed number of non-zero/AC coefficients has been met), may be used. Indeed, in extreme cases, all frequency (e.g., AC) coefficients may be zeroed out so that only DC coefficients remain. Such an approach may replace the macroblock with a flat mean value that requires a relatively small number of bits in order to encode the bitstream.

On the other hand, as the running bit sum 18 transitions from regions 24, through regions 22, and into regions 20, update policies that permit more bits may be gradually selected and applied to the bitstream. Thus, the aforementioned data reduction techniques could be discontinued and/or the QP may be decreased in response to such transitions.

Theory of Operation Overview

In one example, a bit packing module may generate a size (e.g., byte) estimate for each macroblock packed. Additionally, a user can specify a target and maximum size per macroblock, wherein the running sum of these signals (e.g., actual, target, max) may create "curves" that are used to identify when QP adjustments are necessary (see FIG. 2). Three more curves may be symmetrically generated by a quantization rate control module (e.g., upper_midpt, lower_midpt, sum_min) from the target and maximum signals. The values of the target and maximum signals can be specified by the user and may dictate the shape of these curves.

For example, the difference between sum_actual and sum_target (e.g., "bytediff") may identify the margin of error between the target and actual sizes. The difference between the current bytediff and the previously calculated bytediff can represent the rate of change in this margin over time, wherein the sign of this rate is may be used to identify whether the correction is trending in the appropriate direction (e.g., towards bytediff=0).

QPmod

Each macroblock may have a requested QP (which could vary across macroblocks or remain constant). A modification parameter (e.g., "QPmod") can be added to the QP requested, wherein QPmod will be positive when the target was under-predicted and negative when the target is over-predicted. Moreover, QPmod may be incremented or decremented when internal counters (e.g., "over" and "under") reach tripping points (e.g., "grow" and "shrink"). For each MB processed, and based on which region in which the value sum_actual falls, various amounts of points may be added to either counter. If the over counter exceeds the grow point, QPmod can be incremented, whereas if the under counter exceeds the shrink point, QPmod may be decremented.

To dampen the effect of repeated changes in the same direction, an increase in resistance for that direction and decrease in resistance for the complementary direction may be implemented (e.g., "grow_resistance" and "shrink_resistance"). This resistance can be added to the grow point or shrink point, which then requires more points to trip the next correction in that direction.

Additionally, the user can specify guard-bands that limit the amount that QPmod can be modified. For example, QPmod could be constrained to between "QPmax_pos_mod" and "−QPmax_neg_mod_abs".

Triggering

In one example, a rate control module begins to modify QPmod only when it is triggered. Thus, three levels of triggering may exist: "always", "gentle", and "loose". The always level can mean that RC will be active once a parameter "sum_actual" reaches regions 20. The gentle level may trigger rate control once sum_actual reaches regions 22. In addition, the loose level can wait to trigger rate control when sum_actual reaches regions 24.

The rate control module may deactivate (e.g., triggered=false) once sum_actual begins to track sum_target over a series of macroblocks. Specifically, the sign of the rate of change for bytediff can be monitored over a window of macroblocks. When the sum of these signs over the window falls within a tolerance value (e.g., called 'stable'), triggered may be reset to false.

Panic

When enabled, panic mode can occur whenever sum_actual reaches regions 24 and may remain so until sum_actual reaches regions 20. When panicking, all macroblocks can be quantized with QP=MB(n)·QP+QPmax_pos_mod, clamped to a value such as fifty-one.

User Controls

A considerable amount of flexibility can be achieved by allowing the user to define various key parameters. For example, at the per-macroblock level, the values of target and max may be specified and can create various shapes of curves that sum_actual will be compared against.

Moreover, per-slice, the user can specify the triggering sensitivity and the tolerance required to disable the trigger. Additionally, the user can enable panic detection.

The point values assigned to each of the regions 20, 22, 24 may be exposed to the user in order to allow for asymmetrical control for over and under predictions, amongst other things. Additionally, the user can specify the initial values of the grow point and the shrink point along with the resistance values applied when correction is invoked. The maximum and minimum values for QPmod may also be exposed to the user.

Figure 3:
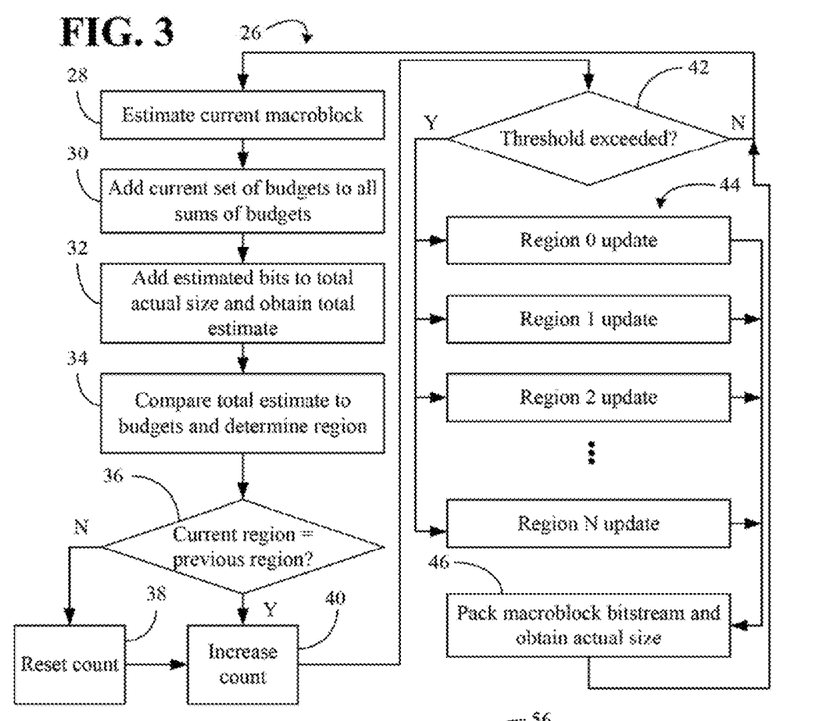
FIG. 3 is a flowchart of an example of a method of using regions to implement a set of macroblock bit budgets according to an embodiment.

Turning now to FIG. 3, a method 26 of using regions to implement a set of macroblock bit budgets is shown. The method 26 may be implemented in fixed-functionality hardware of a wide variety of computing systems using circuit technology such as, for example, ASIC, CMOS or TTL technology, or any combination thereof. Illustrated processing block 28 provides for estimating the number of bits required to encode the current macroblock, wherein the estimation might take into consideration the complexity of the macroblock, whether the macroblock is part of a region of importance, and so forth. For example, the macroblock complexity determination may be based on the pixel variance, the total high frequency magnitude (e.g., among DCT coefficients), the residual error, the previously coded number of bits, etc. If the residual error is predefined using, for example, SAD (sum of absolute difference) or MSE (mean square error), based on statistics, a correlation function may be generated as follows, $$\text{Estimate\_Bits}[k] = \text{Statistics\_Function}(\text{Residual\_Error}[k]); \text{ for } k^{th} \text{ MB}.$$

Moreover, the region of importance determination could be based on a static location (e.g., center of the display), the content of the bitstream (e.g., human faces, moving objects, etc.), external dynamic inputs (e.g., data provided by real-time eye tracking devices), and so forth. In this regard, a weighting function of macroblock importance could be assigned as a fractional weight between zero and one, $$\text{Importance}[k]; \text{ for } k^{th} \text{ MB}.$$

As already noted, the current set of macroblock bit budgets may be added to previous sums of budgets at block 30. Thus, the target bit budget for the current macroblock might be added to a sum of previous target bit budgets, the maximum bit budget for the current macroblock might be added to a sum of previous maximum bit budgets, and so forth, at block 30, to obtain a set of macroblock bit budgets as already discussed. Illustrated block 32 provides for adding the estimated number of bits required to encode the current macroblock to the total actual frame size in order to obtain a total estimated frame size (e.g., running bit sum). The same may be repeated for the maximum, minimum and other bit budgets. The total estimated frame size may then be compared to the set of macroblock bit budgets at block 34, wherein the comparison can enable an identification of a budget region such as the regions 20, 22, 24 (FIG. 2), already discussed.

If it is determined at block 36 that the current region is different from the previous region, block 38 may reset a counter before increasing the counter at block 40. If the current region is the same as the previous region, the counter increase at block 40 can be conducted without resetting the counter. In this regard, the counter may be used to keep QP and/or DCT coefficient adjustments from being made too soon. Thus, only if it is determined at block 42 that the counter has exceeded a predefined threshold, does the illustrated method 26 conduct region specific QP updates at blocks 44. Such hysteresis functionality may significantly improve system performance. The macroblock bitstream may be packed at block 46, wherein the packed bitstream can be used to determine the actual frame size.

Figure 4:
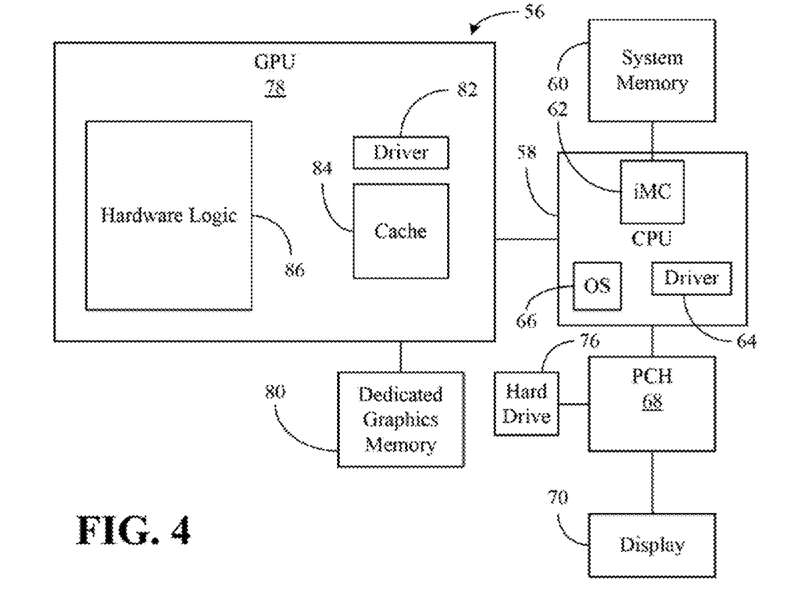
FIG. 4 is a block diagram of an example of a computing platform according to an embodiment.

Turning now to FIG. 4, a platform 56 is shown, wherein the platform 56 may be a mobile platform such as a laptop, mobile Internet device (MID), personal digital assistant (PDA), media player, imaging device, etc., any smart device such as a smart phone, smart tablet and so forth, or any combination thereof. The platform 56 may also be a fixed platform such as a personal computer (PC), server, workstation, smart TV, etc. The illustrated platform 56 includes a central processing unit (CPU, e.g., main processor) 58 with an integrated memory controller (iMC) 62 that provides access to system memory 60, which could include, for example, double data rate (DDR) synchronous dynamic RAM (SDRAM, e.g., DDR3 SDRAM JEDEC Standard JESD79-3C, April 2008) modules. The modules of the system memory 60 may be incorporated, for example, into a single inline memory module (SIMM), dual inline memory module (DIMM), small outline DIMM (SODIMM), and so on. The CPU 58 may also have one or more drivers 64 and/or processor cores (not shown), where each core may be fully functional with instruction fetch units, instruction decoders, level one (L1) cache, execution units, and so on. The CPU 58 could alternatively communicate with an off-chip variation of the iMC 62, also known as a Northbridge, via a front side bus or a point-to-point fabric that interconnects each of the components in the platform 56. The CPU 58 may also execute an operating system (OS) 66 such as a Microsoft Windows, Linux, or Mac (Macintosh) OS.

The illustrated CPU 58 communicates with a platform controller hub (PCH) 68, also known as a Southbridge, via a hub bus. The iMC 62/CPU 58 and the PCH 68 are sometimes referred to as a chipset. The CPU 58 may also be operatively connected to a network (not shown) via a network port (not shown) through the PCH 68. A display 70 (e.g., touch screen, LCD, LED display) could also communicate with the PCH 68 in order to allow a user to view images and/or video from the platform 56. The illustrated PCH 58 is also coupled to storage, which may include a hard drive 76, ROM, optical disk, flash memory (not shown), etc.

The illustrated platform 56 also includes a dedicated graphics processing unit (GPU) 78 coupled to a dedicated graphics memory 80. The dedicated graphics memory 80 could include, for example, GDDR (graphics DDR) or DDR SDRAM modules, or any other memory technology suitable for supporting graphics rendering. The GPU 78 and graphics memory 80 might be installed on a graphics/video card, wherein the GPU 78 could communicate with the CPU 58 via a graphics bus such as a PCI Express Graphics (PEG, e.g., Peripheral Components Interconnect/PCI Express x16 Graphics 150W-ATX Specification 1.0, PCI Special Interest Group) bus, or Accelerated Graphics Port (e.g., AGP V3.0 Interface Specification, September 2002) bus. The graphics card may be integrated onto the system motherboard, into the main CPU 58 die, configured as a discrete card on the motherboard, etc. The GPU 78 may also execute one or more drivers 82, and may include an internal cache 84 to store instructions and other data.

The illustrated GPU 78 includes hardware logic 86 configured to allocate a set of macroblock bit budgets for a bitstream associated with a video signal, and control a frame size of the bitstream based on the set of macroblock bit budgets in a single pass encode configuration. In one example, the hardware logic 86 adjusts one of more quantization parameters of the bitstream according to the set of macroblock bit budgets.

Figure 5:
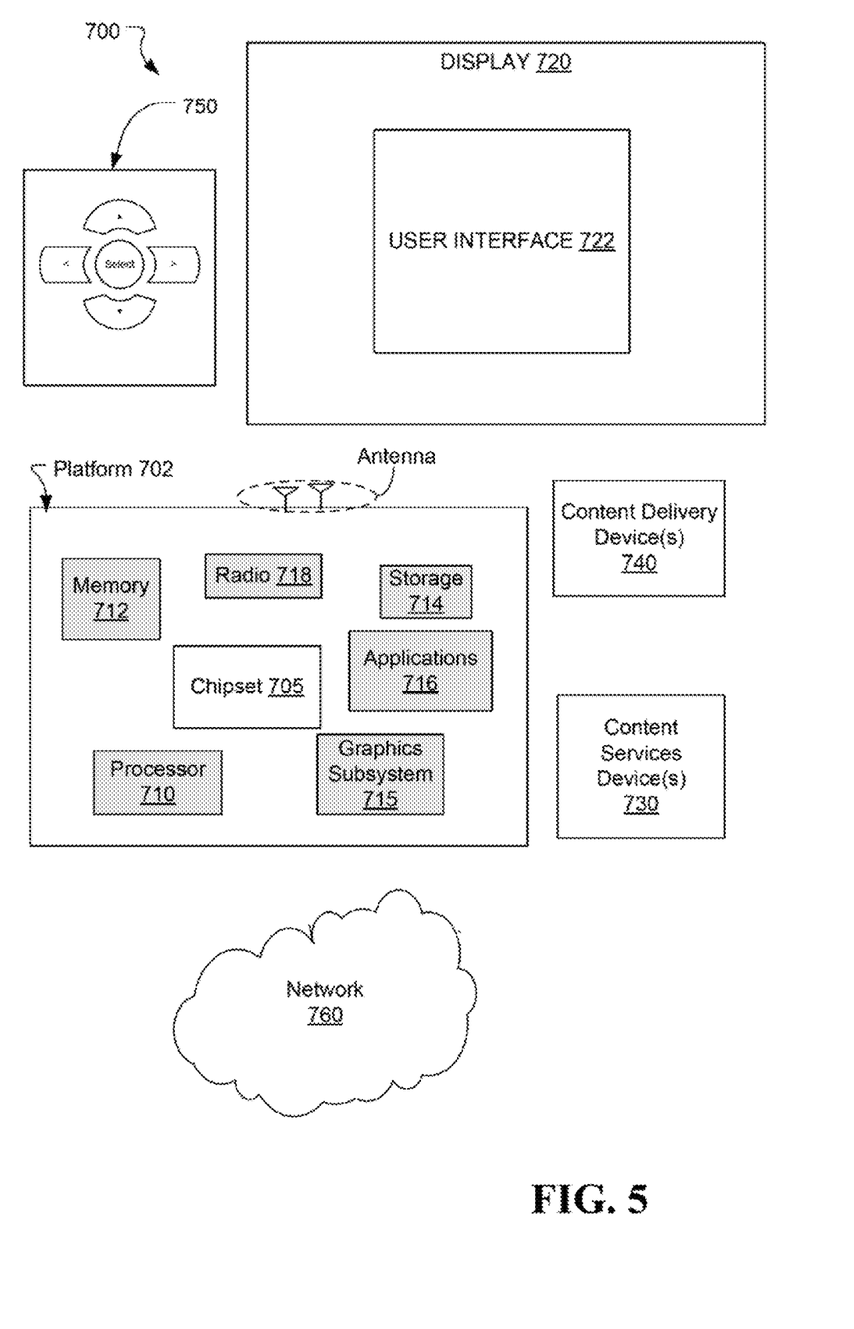
FIG. 5 is a block diagram of an example of a system having a navigation controller according to an embodiment.

FIG. 5 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
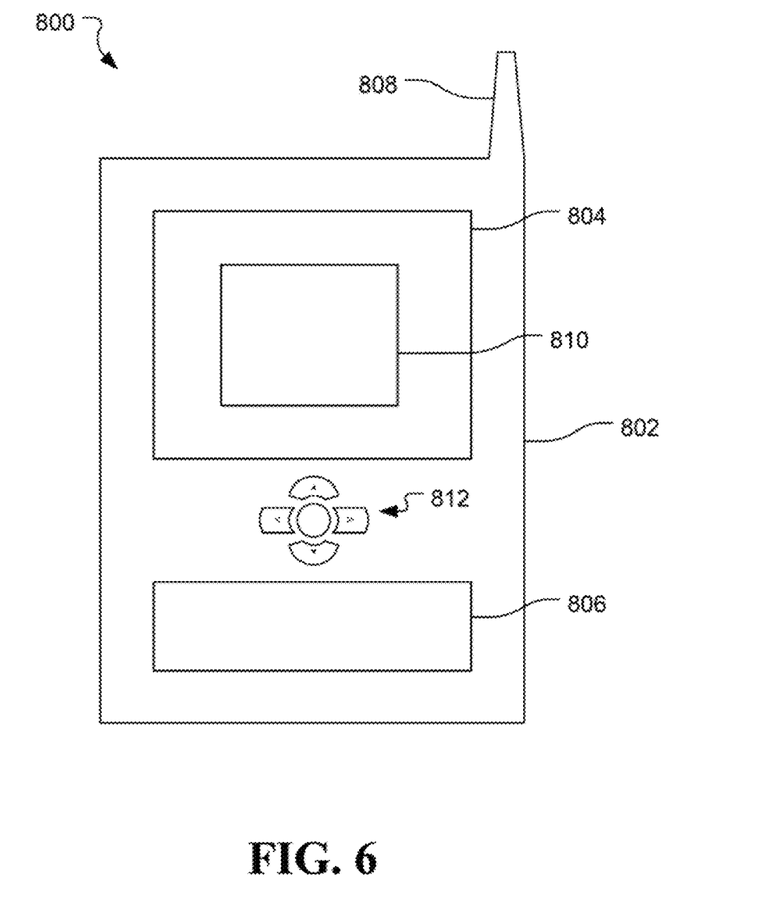
FIG. 6 is a block diagram of an example of a system having a small form factor according to an embodiment.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:
1. A computer implemented method comprising:
determining a macroblock complexity for a bitstream associated with a video signal based on at least one of a macroblock pixel variance, a total high frequency magnitude, a residual error, and a previously coded number of bits;
determining a region of importance for the bitstream based on at least one of a static location, a content of the bitstream, and an external dynamic input;
allocating a set of macroblock bit budgets for the bitstream based on the macroblock complexity and the region of importance;
generating a macroblock size estimate to determine a running bit sum for the bitstream;
conducting a comparison between the running bit sum and the set of macroblock bit budgets;
selecting an update policy based on the comparison; and
controlling a frame size of the bitstream based on the selected update policy in a single pass encode configuration.

2. The method of claim 1, wherein the set of macroblock bit budgets includes a target macroblock bit budget, a minimum macroblock bit budget and a maximum macroblock bit budget.

3. The method of claim 2, wherein the set of macroblock bit budgets further includes an upper average between the target macroblock bit budget and the maximum macroblock bit budget, and a lower average between the target macroblock bit budget and the minimum macroblock bit budget.

4. The method of claim 1, wherein the selected update policy includes at least one of a quantization parameter adjustment and a discrete cosine transform coefficient adjustment.

5. An apparatus comprising:
a computer processor coupled to a memory having stored thereon instructions which, when executed by the computer processor, cause the apparatus to:
determine a macroblock complexity for a bitstream associated with a video signal based on at least one of a macroblock pixel variance, a total high frequency magnitude, a residual error, and a previously coded number of bits;
determine a region of importance for the bitstream based on at least one of a static location, a content of the bitstream, and an external dynamic input;
allocate a set of macroblock bit budgets for the bitstream based on the macroblock complexity and the region of importance;
generate a macroblock size estimate to determine a running bit sum for the bitstream;
conduct a comparison between the running bit sum and the set of macroblock bit budgets;
select an update policy based on the comparison; and
control a frame size of the bitstream based on the selected update policy in a single pass encode configuration.

6. The apparatus of claim 5, wherein the selected update policy is to include at least one of a quantization parameter adjustment and a discrete cosine transform coefficient adjustment.

7. The apparatus of claim 5, wherein the set of macroblock bit budgets is to include a target macroblock bit budget, a minimum macroblock bit budget and a maximum macroblock bit budget.

8. The apparatus of claim 7, wherein the set of macroblock bit budgets is to further include an upper average between the target macroblock bit budget and the maximum macroblock bit budget, and a lower average between the target macroblock bit budget and the minimum macroblock bit budget.

9. A system comprising:
a graphic processor coupled to a hard drive having stored thereon instructions which, when executed by the graphic processor, cause the system to:
determine a macroblock complexity for a bitstream associated with a video signal based on at least one of a macroblock pixel variance, a total high frequency magnitude, a residual error, and a previously coded number of bits;
determine a region of importance for the bitstream based on at least one of a static location, a content of the bitstream, and an external dynamic input;
allocate a set of macroblock bit budgets for the bitstream based on the macroblock complexity and the region of importance;
generate a macroblock size estimate to determine a running bit sum for the bitstream;
conduct a comparison between the running bit sum and the set of macroblock bit budgets;
select an update policy based on the comparison; and
control a frame size of the bitstream based on the selected update policy in a single pass encode configuration.

10. The system of claim 9, wherein the selected update policy is to include at least one of a quantization parameter adjustment and a discrete cosine transform coefficient adjustment.

11. The system of claim 9, wherein the set of macroblock bit budgets is to include a target macroblock bit budget, a minimum macroblock bit budget and a maximum macroblock bit budget.

12. The system of claim 11, wherein the set of macroblock bit budgets is to further include an upper average between the target macroblock bit budget and the maximum macroblock bit budget, and a lower average between the target macroblock bit budget and the minimum macroblock bit budget.

* * * * *